United States Patent [19]

Askienazy et al.

[11] 3,970,762
[45] July 20, 1976

[54] METHOD OF CHEMICAL PEELING OF FRUITS AND VEGETABLES WITH AN ALKANOLAMINE

[75] Inventors: Alexandre Askienazy; Georges Melki, both of Paris; Jean Stevenin, Creteil, all of France

[73] Assignee: Compagnie Francaise de Produits Industriels, Asnieres, France

[22] Filed: Feb. 6, 1974

[21] Appl. No.: 439,974

Related U.S. Application Data

[63] Continuation-in-part of Ser. No. 217,641, Jan. 13, 1972, abandoned.

[30] Foreign Application Priority Data

Jan. 28, 1971  France .............................. 71.02875

[52] U.S. Cl. .............................. 426/287; 426/482; 426/286; 426/506
[51] Int. Cl.² .......................................... A23P 1/00
[58] Field of Search ........... 426/287, 288, 321, 482, 426/286, 506; 252/DIG. 14, 117, 118

[56] References Cited
UNITED STATES PATENTS

| | | | |
|---|---|---|---|
| 1,909,860 | 5/1933 | Harvey | 99/103 |
| 3,663,445 | 5/1972 | Augustin | 252/118 |

*Primary Examiner*—Norman Yudkoff
*Assistant Examiner*—Hiram H. Bernstein
*Attorney, Agent, or Firm*—Fleit & Jacobson

[57] ABSTRACT

A washing and peeling composition for preparing fruits and vegetables contains an alkanolamine and a major amount of a carrier medium such as water. The alkanolamine is preferably monoethanolamine. A surface active agent such as a fatty alcohol sulfate, an alkylarylene sulfonate or a non-ionic agent may be added. The treatment is for one to thirty minutes at a temperature of at least about 20°C depending on the fruit or vegetable concerned. The compositions enable a substantially higher yield of useful product.

8 Claims, No Drawings

METHOD OF CHEMICAL PEELING OF FRUITS AND VEGETABLES WITH AN ALKANOLAMINE

This application is a continuation-in-part of our prior application Ser. No. 217,641 entitled "New compositions for the chemical peeling and washing of fruits and vegetables," filed Jan. 13, 1972, and now abandoned and claiming the priority of French application No. 71 02875, filed Jan. 28, 1971.

The invention relates to new compositions and a method for the chemical washing and peeling of fruit and vegetable produce.

Compositions are already known in the food industry for the chemical peeling of fruits and vegetables. These compositions are in the form of aqueous solutions based on NaOH including if necessary a surface active agent and/or a mineral detergent agent of the alkali carbonate type. The use of these compositions may be dangerous for the operators due to the fact of the presence of soda as an important constituent. Moreover, the treatment of fruits and vegetables by such compositions involves a considerable loss of material which is not only prejudicial to the yield but also rapidly saturates the bath with undesirable debris.

It is an object therefore of the invention to provide compositions not having these drawbacks and responding to the various exigencies of practice better than hitherto.

It is another object to provide an improved method for the washing and peeling of fruits and vegetables.

It is a further object to improve the yields obtained in such methods.

Another object is to facilitate handling particularly by the easy preparation of the said compositions used for the method according to the invention.

The new compositions according to the invention comprise at least one free alkanolamine in aqueous solution. These alkanolamines are selected among the monoalkanolamines, the dialkanolamines and the trialkanolamines.

Good results have been obtained, in particular with monoethanolamine as the active substance, the fruits and vegetables treated comprising, for example, fruits such as citrus fruits (oranges, grapefruit, mandarines, etc.), apples, pears; shelled nuts such as chestnuts, walnuts, almonds; vegetables such as salsify, potatoes, carrots, turnips, tomatoes, celery, beetroot, etc.

The method according to the invention for the chemical peeling of fruits and vegetables comprises treating said fruits or vegetables in a composition according to the invention until the skin becomes detached without attacking the pulp, removing the loosened skin and rootlets and recovering the peeled products.

The compositions according to the invention are also suitable for the washing of all leafy vegetables.

Advantageously, the alkanolamines are used in combination with surface active or tensio-active agents.

A tensio-active agents, recourse may be had to those of the group comprising non-ionic agents, fatty alcohol sufates, and alkyl-arylene sulfonates.

In addition, these solutions can include, in certain cases, a small quantity of mineral detergent agent constituted for example by an alkali such as NaOH or KOH, or by an alkali salt, especially sodium phosphates and carbonates. The percentage of alkali thus added is selected sufficiently low to avoid the drawbacks of the baths of the prior art. Of course, so low a concentration would render the baths concerned inoperative from the industrial point of view in the absence of the other constituents to provide the composition according to the invention.

Experiments carried out by Applicants have shown that the content of active substance of the compositions according to the invention must be from 0.2 to 20%. If a surface active agent is used, it should be present in a quantity from at least 0.002%.

The application of the abovesaid compositions — supplemented if necessary with a small amount (of the order of 2% or even less) of a mineral detergent agent for example of the above-mentioned type — is effected at a temperature of at least room temperature, about 20C up to a temperature of the order of 100°C, according to the produce concerned. The duration of treatment is generally between 1 and 30 minutes, preferably between 4 and 10 minutes.

The compositions according to the invention penetrate into the surface of the treated vegetables or fruits and detach the skin without attacking the pulp, thus considerably reducing the loss of vegetable and fruit material to ensure careful control, the quality of the fruit or vegetable being also improved. This method of processing is particularly advantageous in the case of root vegetables with rootlets, the latter being detached under the effect of the composition without causing, as in the case of the soda — i.e., NaOH — based baths of the prior art, destruction in depth of the sub-surface vegetable tissue.

The presence of the surface active agent facilitates the penetration of the active substance during the treatment into the vegetable material, and consequently the detachment of the skin and enables easier removal of the peelings during washing.

The application of the compositions according to the invention may be effected by means of any apparatus usable for the skinning or washing of fruits or vegetables.

To illustrate the invention, a certain number of numerical examples are given below, purely by way of non-limiting illustration.

EXAMPLE I

Peeling of salsify a. By means of a composition according to the invention:

Two tons of salsify are continuously treated in a conventional installation, for 8 minutes, in a bath brought to 90°–100°C and having the following composition:

| | |
|---|---|
| — water | 96% |
| — monoethanolamine | 4% |
| — poly (oxyethylene) sorbitan monolaurate (known in commerce by the name of TWEEN 20) | 0.02% |

The vegetables are then washed and the necks (between the root and the stem) and hairs are removed manually.

After cooking and sterilisation, 1100 to 1200 kg of ready-to-use vegetables are obtained, namely a yield of 57.5%.

The loss amounts in this case to 42.5%.

b. By means of a composition according to the prior art:

Two tons of salsify of the same type as previously are subjected to peeling, under the same conditions of temperature and duration of processing, but having recourse to an 8% solution of soda. There are then obtained 850 kg of vegetables, namely a yield of 42%, the loss amounting to 58%.

The comparison of the results of these two experiments shows that the yield passes from 42 to 57.5%.

EXAMPLE II

Peeling of potatoes a. By means of a composition according to the invention:

In a conventional installation there are treated, continuously, for 7 minutes, 2 tons of potatoes, intended for the preparation of mashed potato, into a bath brought to 90° to 100°C and having the following composition:

| | |
|---|---|
| — water | 90% |
| — monoethanolamine | 10% |
| — commercial fatty alcohol sulfate with 40% of active materials | 0.50% |

After washing, 1.6 tons of vegetables ready for subsequent processing are obtained, namely a yield of 80%. The loss is in this case 20%.

b. By means of a prior art composition:

To operate under the same conditions of temperature and time as above, it is necessary for the concentration of soda to be 25%. This signifies that the alkalinity of the medium must be much higher than that of the composition used in (a). There is obtained by this treatment and after washing 1280 kg, which corresponds to a yield of 64%, hence a loss of 36%.

Various experiments show that it is not possible to reduce this loss. In fact, if the soda concentration of the solution is reduced, the duration of treatment must be increased and the loss remains finally the same.

Comparison of the results of these two experiments shows that, by means of the invention, the yield passes from 1280 kg to 1600 kg, that is to say 64% to 80%.

EXAMPLE III

Peeling of carrots a. By means of a composition according to the invention:

One ton of carrots is treated, for 6 minutes, in a bath brought to 90°C and including 2% of monoethanolamine and 0.30% of sodium dodecylbenzene sulfonate with 30% of active materials.

At the end of the operations, the vegetables are obtained with a yield of 97.5%, the loss being 2.5%.

b. By means of a composition of the prior art:

Under the same conditions as above, there is obtained, by using a bath including 7% of soda, a yield of 86%, the loss being 14%.

From the comparison of the results of the two abovementioned experiments, it emerges that, due to the invention, the increase in the yield is of the order of 11.5%.

c. By replacement under the conditions of (a), of monoethanolamine by monoisopropanolamine, the yield is of 94%.

EXAMPLE IV

Grapefruit (Jaffa)

The outer skin or rind having been removed by mechanical means, the white inner skin is removed by treating the fruits for 2 minutes in a bath kept at 75°C, and containing 2.4% of monoethanolamine, 0.6% of sorbitan poly(oxyethylene) monolaurate (trade name: TWEEN 20), 1% of sodium alkylbenzene sulfonate with 30% of active materials and 4.2% of a mineral detergent (caustic potash).

The white skin is entirely removed, the fruit remaining intact.

EXAMPLE V

Mandarines (Satsuma variety)

a. By means of a composition according to the invention.

The rind or peel having been removed by immersion in boiling water, the segments are separated mechanically. The white inner skin is removed by conventional treatment with a hydrochloric medium, for example at a concentration of 2% HCl in water, for 1 hour at 30°–35°C, then rinsed in running water.

There then remains a transparent skin, which is removed by immersion for 6 minutes in a bath according to the invention, at the temperature of 22°–25°C, and containing 0.2% of monoethanolamine, 0.07% of sorbitan poly(oxyethylene)monolaurate (trade name: TWEEN 20), 0.05% of sodium alkylbenzene sulfonate containing 30% of active materials, and 0.6% of a mineral detergent (caustic potash).

Peeled segments are obtained whose texture is intact. There are only about 5 to 6% of broken segments.

b. By means of a composition of the prior art.

The removal of the rind and of the white skin having been carried out as under (a), the transparent skin is removed by the prior art method of immersion for 6 minutes in an aqueous solution of with 30 grams NaOH per liter, at a temperature of 30°–35°C.

Peeled segments are obtained. There are about 16 to 17% of broken segments. The texture of non-broken segments is injured; this fact is proved by the fragility of the not broken segments.

EXAMPLE VI

Peeling of carrots

Procedure was as in Example III above, but replacing monoethanolamine by monoisopropanolamine.

Yield obtained: 94%

EXAMPLE VII

Tomatoes a. By means of a composition according to the invention.

One ton of tomatoes were treated for 1 minute in a bath at 90°C, containing 4.8% of monoethanolamine, 0.25% of sorbitan poly(oxyethylene) monolaurate (trade name: TWEEN 20), 2.5% of sodium alkylbenzene sulfonate containing 30% of active materials, and 4% of a mineral detergent (caustic potash).

900 kg of peeled tomatoes are obtained.

b. By means of a composition of the prior art.

Treatment was effected for 1 minute at 90°C, in a bath containing 20% of caustic soda.

There were obtained 750 kg of peeled tomatoes.

EXAMPLE VIII

Procedure was as in Example VII but replacing monoethanolamine by diethanolamine.

Yield 860 kg

EXAMPLE IX

Procedure was in the Example VII, but replacing monoethanolamine by triethanolamine.

Yield 800 kg.

EXAMPLE X

Apples a. By means of a composition according to the invention.

One ton of apples of the "Golden Delicious" variety were treated for 1 minute 30 seconds, in a bath at 90°C and containing 6% of monoethanolamine, 0.18% of sorbitan poly(oxyethylene) monolaurate (trade name: TWEEN 20), 2% of sodium alkylbenzene sulfonate with 30% of active materials, and 2% of an alkaline detergent (caustic soda).

There are obtained 900 kg of uncored peeled fruits.

b. By means of the prior art.

Manual or mechanical peeling, which is generally used, according to the prior art, of the same quantity and variety as under (a) resulted, before coring, in about 750 kg of peeled fruits.

EXAMPLE XI

The same variety and quantity of apples were used as in example X but replacing monoethanolamine by monoisopropanolamine.

Yield was 900 kg.

EXAMPLE XII

Pears a. By means of a composition according to the invention.

One ton of pears of the "William" variety, were treated for 1 minute, at a temperature of 90° to 95°C, in a bath containing 4% of monoethanolamine, 0.1% of sorbitan poly(oxyethylene) monolaurate (trade name; TWEEN 20), 1.2% of sodium alkylbenzene sulfonate with 30% of active materials.

850 kg of peeled, uncored fruits were obtained.

b. By means of the prior art.

Manual of mechanical peeling as generally used, in the prior art resulted, before coring, in 650 kg of peeled fruit.

EXAMPLE XIII

Peeling of chestnuts

All chestnuts for consumption comprise a cortex or outer skin and an inner skin. Distinction can be made between:

a. fresh chestnuts;

b. refrigerated chestnuts which are more friable;

c. deep-frozen chestnuts from Italy whose peeling is more easily effected by conventional methods; and d. deep-frozen chestnuts from Portugal whose peeling is very difficult by conventional methods.

In this Example the treatment relates to peeling deep-frozen chestnuts from Portugal.

a. Peeling by the method according to the prior art.

Immersion of the frozen chestnuts (their temperature was about −20°) in water brought to a temperature of 90°C.

After draining, the chestnuts were passed over burners for 1 to 2 seconds then into a beater which comprises jets of cold water under pressure and rotary brushes to remove the outer skin.

Removal of the inner skin and the bad portions is effected manually with a knife.

This method has the drawback at the time of the burning operation, that a considerable percentage of the chestnuts are burnt at the surface of the flesh. Also the removal of the skin is difficult and results in a considerable loss of the fruit.

The yields are as follows:

To obtain a sufficient quantity of chestnuts to fill a 4/4 box, 984 grams of chestnuts are to be used.

To produce 100 4/4 boxes about 11½ hours of work are required.

b. By means of a solution according to the invention.

The solution used contains:

3.6% of monoethanolamine 0.2% of a condensate of 8 to 10 moles of ethylene oxide with tridecylalcohol 2.5% of a sodium alkyl benzene sulfonate with 30% active material and 0.3% of an alkaline detergent (a mixture of caustic soda and caustic potash in a 2 to 1 ratio)

Successively the chestnuts (frozen to −20°) were immersed in the above-mentioned solution for 4 minutes, at a temperature of 94°C.

the chestnuts so treated were roasted and passed over a beater under usual conditions.

The resulting advantages were:

Peeling time reduced to the strict minimum hence less burning of kernels;

at the outlet from the beater the chestnuts no longer included outer skins but 24% are also without inner skin;

the inner skin remaining on 75% of the chestnuts emerging from the beater was easily removed;

production of more whole chestnuts, improving the proportion of intact kernels for preparations called "natural," hence reduction in the weight of scraps and a gain in handling time.

To constitute a 4/4 box it is necessary to use 683 grams of chestnuts, therefore 300 g less than with the conventional method.

To treat the amount of chestnuts necessary for the production of 100 boxes of 4/4, about 6 hours of work are required, namely a gain in time of 6 hours with respect to the normal method.

As a general rule, the peeled chestnuts are used for the following preparations: (1) creamed chestnuts; (2) natural chestnuts (for cooking recipes); (3) glazed chestnuts; (4) chestnuts in syrup.

EXAMPLE XIV

Red beetroot a. By means of a composition according to the invention.

One ton of red beetroot was treated for 2½ minutes, in a bath at 90°C, containing 2% of monoethanolamine, 0.05% of sorbitan poly(oxyethylene) monolaurate (trade name "TWEEN 20"), 0.75% of sodium alkylbenzene sulfonate with 30% of active materials, and 4% of mineral detergent (caustic soda).

900 kg of peeled vegetables are obtained.

a. By means of a composition according to the prior art.

Treatment was effected in a bath at 90°C, containing 18% of caustic soda, for 3 minutes.

Only 750 to 800 of peeled vegetables are obtained.

EXAMPLE XV

Turnips a. By means of a composition according to the invention.

One ton of vegetables were treated for 3 minutes, in a bath at 90°C, containing 1.4% of monoethanolamine, 0.07% of a condensate of 8–10 moles of ethylene oxide with tridecylalcohol, 1% of sodium alkylbenzenesulfonate with 30% of active materials, and 0.14% of a mineral detergent (caustic soda).

There are obtained 900 to 950 kg of peeled vegetables.

b. By means of a composition according to the prior art.

Treatment was effected in a bath at 90°C, containing 10% of caustic soda for 3 to 5 minutes.

There were obtained 750 to 800 kg of peeled vegetables.

The above-mentioned comparative Examples establish the superiority of the compositions according to the invention with respect to conventional compositions.

For each of the types of produce processed, there is noted a distinctive increase in the yield. The production capacity of the installation can also be increased by increasing the concentration of the alkanolamine solution and by simultaneously lowering the time of treatment, without increasing the loss of material. On the other hand, it is not possible to proceed in the same manner in the case of conventional soda-based solutions since the percentage of loss of material is an exponential function of the concentration of soda.

In addition, the cost of the products used is less in spite of the higher price of alkanolamines, considering that the concentration of active products of the compositions according to the invention is less than that of the prior art solutions and considering that the consumption of the active products is less. Hence the maintenance of the concentration of active products of the compositions according to the invention necessitates less frequent and smaller replenishment of active products to the solution.

For reasons of convenience, the compositions according to the invention may be distributed advantageously in the form of concentrates, which it suffices to dilute at the time of use, for example, with water.

There are thus provided, whatever the embodiment adopted, compositions for the washing and peeling of vegetables and fruits, whose characteristics and advantages emerge sufficiently from the foregoing for it to be unnecessary to dwell further on this subject.

As is self-evident, and as emerges already from the foregoing, the invention is in no way limited to those of its types of application, nor to those of its embodiments of its various parts, which have been more especially considered: it encompasses, on the contrary, all variations.

We claim:

1. A method for chemical peeling the skin of fruits and vegetables which comprises (1) applying to a fruit or vegetable an aqueous composition comprising from about 0.2 to about 20% by weight of at least one alkanolamine selected from the group consisting of mono-, di-, and tri-alkanolamines, at a temperature of at least about 20°C for from about one to about 30 minutes, to loosen the skin without attacking the pulp, (2) removing the loosened skin from the pulp, and (3) recovering the peeled fruit or vegetable.

2. Method according to claim 1, wherein the time of treatment is from about four to about ten minutes.

3. The method according to claim 1 wherein the alkanolamine is a monoalkanolamine.

4. The method of claim 3 wherein the monoalkanolamine is monoethanolamine.

5. The method according to claim 1 wherein the alkanolamine is a monoisopropanolamine.

6. The method of claim 1 wherein said aqueous composition includes a surface active agent comprising at least one member selected from the group consisting of sulfates of fatty alcohols, alkyl-arylene sulfonates and non-ionic surface active agents.

7. The method of claim 1 wherein the applying of the aqueous composition to said fruit or vegetable is accomplished by placing said fruit or vegetable in a bath consisting of said aqueous composition.

8. A method for chemical peeling the skin from fruits and vegetables which comprises:
   1. maintaining the fruit or vegetable in continuous contact with an aqueous composition at a temperature of at least 20C for from about 1 to 30 minutes in order to loosen the skin without attacking the pulp, said aqueous composition comprising from about 0.2 to about 20% by weight of an alkanolamine selected from the group consisting of mono-, di-, and tri-alkanolamines,
   2. removing the loosened skin from the pulp, and
   3. recovering the peeled fruit or vegetable.

* * * * *